United States Patent Office 3,175,965
Patented Mar. 30, 1965

3,175,965
ELECTROLYSIS OF PIG IRON CONTAINING COPPER
Shizuo Sato and Kenzi Hagimori, both of Gunma-ken, Japan, assignors to Toho Aen Kabushiki Kaisha, Tokyo, Japan, a joint-stock company of Japan
No Drawing. Filed Mar. 6, 1962, Ser. No. 177,722
Claims priority, application Japan, July 15, 1961, 36/25,372
2 Claims. (Cl. 204—112)

This invention relates to a new method of obtaining electrolytic iron by electrolysis from pig iron which contains copper and at the same time, separating and recovering gold, silver, and copper.

Methods of electrolysis of iron are known, and some have been reduced to industrial practice. The common methods are the refining electrolysis method and the extraction electrolysis method. These methods, however, have the following disadvantages.

In the refining electrolysis method, carbon steel is generally used for the anode. The carbon within the anode becomes an insoluble substance of very fine grain size which becomes suspended in the electrolyte and adheres to and contaminates the cathode iron. Furthermore, various impurities and iron hydroxide which form additional slime all become sediments of fine grain size causing turbidity in the electrolyte and adhere to the cathode, thereby lowering its quality. In order to solve this problem, such measures as the use of a membrane or the filtration of the electrolyte have been resorted to. However, in all such cases, difficulties are caused by clogging due to the minute particles of iron hydroxide; in the case of a membrane, a rise in voltage is caused, and in the case of filtration, the filtration becomes difficult. Accordingly, all such measures are accompanied by considerable difficulty and high cost. Consequently, in order to obtain electrolytic iron of high grade by an ordinary refining electrolysis method, various restrictions are unavoidably imposed on the starting material. The necessity of using low carbon steel as a starting material is a particularly serious disadvantage.

There have been some reports of production of electrolytic iron of high purity by the extraction electrolysis method. However, in this method also, it is necessary to cause complete dissolution of iron in the electrolyte and to remove completely, by chemical and physical methods, ions of metals which are more noble than iron, ions which are detrimental to electrolysis, insoluble residues, and other undesirable substances. Furthermore, it is difficult to practice this method in an economically feasible manner because of such reasons as high basic unit of electrolysis power.

In view of the above-described disadvantages of conventional methods, it is a general object of the present invention to provide a new method of producing electrolytic iron of high quality, wherein the above-described disadvantages are eliminated or greatly reduced.

It is another object to provide a method as stated above which can be practiced economically by an extremely simple electrolysis process.

The foregoing objects and other objects and advantages of the present invention as will presently become apparent have been achieved by the method of the present invention, which, briefly stated, comprises accomplishing refining electrolysis of pig iron containing copper, through the use of a Mohr's salt bath with copper as an effective anode impurity, to produce electrolytic iron and, at the same time, separating and recovering such substances as gold, silver and copper. More specifically, by the method of this invention, use is made of pig iron containing copper, for example, such as that obtained by reducing melting of, for example, dry-type zinc slag after zinc has been recovered therefrom in the form of dust, and refining electrolysis is carried out by means of a Mohr's salt bath with this copper-containing pig iron as the anode, thereby extracting electrolytic iron on the cathode.

The details of the invention and the manner in which its objects may best be achieved will be apparent by reference to the following description beginning with a consideration of the copper-iron phase diagram.

Since copper forms a solid solution within iron to the extent of 0.4 to 0.5% at normal temperature, with copper in the range of 0.5 to 2.5%, 0.5% of more of the copper separates out at the crystalline grain boundary of the iron. In fact, by microscopic examination of the pig iron anode, a network of shiny brass color is visible at the pearlitic crystalline grain boundary. Since copper, electrochemically, is much more noble than iron, it does not dissolve out into the solution when electrolysis of the iron is carried out but remains unchanged in the anode. That is, only the iron goes into the electrolyte, and the copper remains unchanged in the state of network form on the anode surface, appearing as though a membrane of fine mesh were enveloping the anode. This network envelope restrains the insoluble constituents, such as carbon and silicon, in the pig iron from entering into the electrolyte. When the copper content within the iron is 2.5% to 3.0% or higher, the resulting structure, according to the phase diagram, should be one wherein a solid solution of copper is separated out at the grain boundary of the eutectic crystal. If, however, sulfur is contained within the starting material, a copper matte is formed and separates from the pig iron. In this case, accordingly, it is unlikely that the copper content within the pig iron will be greater than 2.5 to 3.0%.

The copper which has separated out in network form at the grain boundary of iron coexists with the iron in the electrolyte and forms a local electric cell therewith. Therefore, if the copper content within the pig iron is 0.4 to 0.5% or higher, the solubility of the iron in the electrolyte should be higher than in the case wherein copper is non-existent. Accordingly, the solubility of the anode in the electrolyte is increased.

By the method of the present invention, wherein the foregoing phenomena are advantageously utilized, it is possible to obtain high-grade electrolytic iron by an extremely simple electrolysis process. That is, the copper component contained within the anode is utilized as an impurity which imparts advantageous effect to increase the solubility of the anode, whereby the slime created assumes a laminar form and adheres to the anode with ample porosity with respect to passage of electrolyte yet with suitable firmness whereby it is not readily shed. Accordingly, electrolysis can be continued for a long time under excellent conditions with pig iron or, of course, high-carbon steel as the starting material.

In order to indicate still more fully the exact nature of the present invention, a few examples of method according to the invention, setting forth details of representative conditions are presented below for the purpose of illustration and description.

Example 1

Electrolysis under the following conditions was carried out.

Composition (percent by weight) of anode: 1.53 C, 0.25 P, 0.39 S, 2.22 Si, 0.74 Mn, 2.55 Cu, 233 (g./t.) Ag, -Au, 0.055 In, 91.3 Fe.

Electrolyte: Mohr's salt solution $$(FeSO_4 \cdot (NH_4)_2SO_4 \cdot 6H_2O)$$

Fe concentration, 51.1 g./litre; pH value 3.0 to 5.4.
Electric current density: 1.25 a./dm.$^2$
Electrolyte temperature: 60° C.
Electrolysis duration: 23 days.
Distance between electrodes: 50 mm. between mutually confronting surfaces of anode and cathode.
Electrolysis voltage: 0.8 to 0.83 volt.

The resulting compositions (percent by weight except as designated) of the product electrolytic iron and the slime were as follows:

| Elements | Electrolytic Iron | Slime |
|---|---|---|
| C | 0.001 | 4.9 |
| P | 0.010 | |
| S | 0.003 | 5.6 |
| Si | 0.002 (max.) | 12.9 |
| Mn | 0.003 | 3.4 |
| Cu | 0.004 | 9.4 |
| Ag | ND | 602 g/t |
| Au | ND | 7g./t. |
| In | ND | 0.3 |
| Fe | 99.9 | 41.4 |

NOTE.—The abbreviation "ND" denotes "not detecrable". G./t. means grams per ton.

Example 2

Electrolysis under the following conditions was carried out.

Composition (percent by weight) of anode: 1.60 C, 0.098 P, 0.18 S, 1.96 Si, 1.65 Mn, 1.56 Cu, 195 (g./t.) Ag, -Au, 0.049 In, 87.0 Fe.

Electrolyte: Mohr's salt solution $$(FeSO_4 \cdot (NH_4)_2SO_4 \cdot 6H_2O)$$

Fe concentration: 50.0 g./litre; pH value: 3.0 to 5.4.
Electric current density: 1.00 a./dm.$^2$
Electrolyte temperature: 60° C.
Electrolysis duration: 26 days.
Distance between electrodes: 60 mm. between mutually confronting surfaces of anode and cathode.
Electrolysis voltage: 1.0 to 1.2 volts.

The resulting compositions (percent by weight except as designated) of the product electrolytic iron and slime were as follows:

| Elements | Electrolytic Iron | Slime |
|---|---|---|
| C | 0.001 | |
| P | 0.010 | 0.41 |
| S | 0.002 | |
| Si | 0.002 (max.) | 7.32 |
| Mn | 0.003 | |
| Cu | 0.007 | 6.49 |
| Ag | | .772 g./t. |
| Au | | 6.0 g./t. |
| In | | 0.19 |
| Fe | 99.9 | 27.4 |

In both of the foregoing Examples 1 and 2, there was almost no variation of electrolysis voltage; the current efficiency was indicated to be 95 to 98 percent; the electrodeposition was good; the electrolyte underwent changes in a clear state throughout the process; and electrolytic iron having white metallic lustre was obtained on the cathode. After 23 to 26 days of electrolysis the quantity of slime adhering to the anode was indicated to be 90 percent of the total quantity formed, and that settling in the electrolysis tank was only 10 percent of the total quantity. The anode after completion of electrolysis retained its original form, but when the slime was peeled off, it was observed that the anode had dissolved uniformly, and an infinitesimally low scrap rate was indicated.

The results of the foregoing examples indicated that, by electrolysis according to the method of this invention of iron containing 0.5% or more of copper, as described above, electrolytic iron can be easily produced, and copper, gold, silver, and other substances can be separated and recovered at the same time, excellent results indicated particularly in the case of a copper content of 1.1 to 2.5 percent.

Example 3

For the purpose of comparison with the foregoing examples, electrolysis of carbon steel was carried out under the same conditions. The results were as indicated in the following table and description.

(Unit: percent by weight except as indicated)

| Elements | Anode | Electrolytic Iron | Slime |
|---|---|---|---|
| C | 0.60 | 0.021 | 0.63 |
| P | 0.03 | 0.009 | |
| S | 0.03 | 0.008 | |
| Si | 0.007 | 0.002 | 0.6 |
| Mn | 0.30 | 0.006 | |
| Cu | 0.055 | 0.006 | 4.8 |
| Fe | Remainder | Remainder | 57.0 |

Although the electrolysis conditions were the same as those in the other foregoing examples, the slime was in powder form, easily fell off, and became a suspension; the dissolving action was irregular; and continuation of electrolysis over a long period was impossible.

After electrolysis for 5 days, the quantity of slime adhering to the anode was only 42 percent of the total quantity formed, and 58 percent thereof was shed or became a suspension in the electrolysis tank. Furthermore, the turbidity of the electrolyte increased with elapse of time.

As is apparent from the foregoing description, the method of this invention has several advantages over the conventional methods for obtaining electrolytic iron by the refining electrolysis method. The principal advantageous features of the method of the present invention may be enumerated as follows:

(1) The dissolving of the anode is uniform, and the scrap rate is low;
(2) Voltage rise is not caused by the increase of thickness of the slime layer;
(3) Since the solubility of the anode is high, almost no oxidation of the electrolyte takes place;
(4) The slime recovery operation is easy;
(5) There is no shedding of slime to become a suspension in the electrolyte, wherefore such measures as distillation of the electrolyte to remove the suspension or the use of a dialyzing membrane are unnecessary; and
(6) There is no contamination of the electroyltic iron by free powdery slime formed by ordinary electroyltic refining from mild steel.

Although this invention has been described with respect to particular examples thereof, it is not to be so limited as changes and modifications may be made therein which are within the full intended scope of the invention, as defined by the appended claims.

What is claimed is:

1. A method for the electrolytic refining of impure pig iron which comprises maintaining impure cast iron anodes containing 1.1–2.5 weight percent copper in an aqueous electrolyte solution containing Mohr's salt, electrolyzing the solution to deposit iron cathodically, recovering the cathodically deposited iron, and recovering undissolved anode impurities.

2. The method of claim 1 wherein the electrolytic current density is 1.0–1.25 amperes/decimeter$^2$.

References Cited by the Examiner

UNITED STATES PATENTS 2,301,492  11/42  Young _____ 204—112

FOREIGN PATENTS 451,638  10/48  Canada.

OTHER REFERENCES

Johnston: The Metal Industry, March 1927, pages 241–242.

WINSTON A. DOUGLAS, *Primary Examiner.*

MURRAY TILLMAN, *Examiner.*